United States Patent
Iwasaki (10) Patent No.: US 9,214,177 B2
(45) Date of Patent: *Dec. 15, 2015

(54) PERPENDICULAR MAGNETIC RECORDING MEDIUM AND MAGNETIC RECORDING AND REPRODUCING APPARATUS

(71) Applicant: KABUSHIKI KAISHA TOSHIBA, Minato-ku (JP)

(72) Inventor: Takeshi Iwasaki, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/193,497

(22) Filed: Feb. 28, 2014

(65) Prior Publication Data

US 2015/0162041 A1  Jun. 11, 2015

(30) Foreign Application Priority Data

Dec. 6, 2013 (JP) ................................ 2013-252969

(51) Int. Cl.
*G11B 5/66* (2006.01)
*G11B 5/73* (2006.01)

(52) U.S. Cl.
CPC *G11B 5/66* (2013.01); *G11B 5/732* (2013.01); *G11B 5/7325* (2013.01)

(58) Field of Classification Search
None
See application file for complete search history.

(56) References Cited

U.S. PATENT DOCUMENTS

| 6,824,817 | B2 | 11/2004 | Araki et al. | |
| 7,601,444 | B2 | 10/2009 | Lai et al. | |
| 8,034,471 | B2 * | 10/2011 | Ishibashi et al. | 428/831.2 |
| 2003/0170500 | A1 | 9/2003 | Shimizu et al. | |
| 2004/0048092 | A1 * | 3/2004 | Yasui et al. | 428/642 |
| 2009/0147401 | A1 | 6/2009 | Takahashi et al. | |
| 2012/0154948 | A1 * | 6/2012 | Tamai et al. | 360/75 |
| 2013/0250453 | A1 * | 9/2013 | Iwasaki | 360/99.08 |
| 2015/0004436 | A1 * | 1/2015 | Iwasaki | 428/814 |

FOREIGN PATENT DOCUMENTS

| JP | 2003-123245 |   | 4/2003 |
| JP | 2013-125554 | * | 6/2013 |
| JP | 2013-196752 |   | 9/2013 |

OTHER PUBLICATIONS

English machine translation, JP 2013-125554, Japan, Sakawaki et al., Jun. 2013.*
U.S. Appl. No. 14/513,461, filed Oct. 14, 2014, Iwasaki, et al.

* cited by examiner

Primary Examiner — Holly Rickman
(74) Attorney, Agent, or Firm — Oblon, McClelland, Maier & Neustadt, L.L.P.

(57) ABSTRACT

According to one embodiment, provided is a perpendicular magnetic recording medium including an orientation control layer formed on a non-magnetic substrate, the orientation control layer consisting of a Ni alloy having fcc structure, non-magnetic buffer layer containing silver having fcc structure, non-magnetic seed layer consisting of Ag particles having fcc structure and amorphous Ge grain boundaries between the Ag particles, non-magnetic intermediate layer consisting of Ru or Ru alloy, and perpendicular magnetic recording layer, wherein the orientation control layer contacts the non-magnetic buffer layer, and the non-magnetic buffer layer contacts the non-magnetic seed layer.

14 Claims, 5 Drawing Sheets

PERPENDICULAR MAGNETIC RECORDING MEDIUM AND MAGNETIC RECORDING AND REPRODUCING APPARATUS

CROSS-REFERENCE TO RELATED APPLICATIONS

This application is based upon and claims the benefit of priority from Japanese Patent Application No. 2013-252969, filed Dec. 6, 2013, the entire contents of which are incorporated herein by reference.

FIELD

Embodiments described herein relate generally to a perpendicular magnetic recording medium and a magnetic recording and reproducing apparatus.

BACKGROUND

A magnetic recording device such as a hard disk drive (HDD) used mainly in a computer to record and reproduce information has been applied to various fields such as home video recorder, audio device, and vehicle-mounted navigation system because of its excellent capacitance, cost effectiveness, data accessibility, and data-hold credibility. As HDD technique is being adopted in broader technical fields, higher storage capacity is required, and thus, developments of HDD with higher density have been pursued intensely in recent years.

As a magnetic recording method used in a commercially available HDD, a so-called perpendicular magnetic recording method is the mainstream in recent years. In the perpendicular magnetic recording method, a magnetic recording layer used to record information is made of magnetic crystal grains which have their easily magnetization axes in a direction orthogonal to a substrate of the layer. With such a structure, influence by an inverse magnetic field between recording bits can be reduced even in a densification process and the densification process itself can be performed in a magnetostatically stable condition. The perpendicular magnetic recording medium is generally structured with a substrate, soft magnetic underlayer to concentrate magnetic flux generated from a magnetic head in the recording, non-magnetic seed layer and/or non-magnetic underlayer to place the magnetic crystal grains in (00.1) surface orientation and reduce the orientation dispersion therein, perpendicular magnetic recording layer containing a hard magnetic material, and protective layer to protect the surface of the perpendicular magnetic recording layer.

A granular-type recording layer has a so-called granular structure in which the magnetic crystal grains are surrounded by grain boundary regions consisting of non-magnetic substances, and therein, the magnetic crystal grains are two-dimensionally and physically isolated from each other by the non-magnetic grain boundary region and such a structure achieves reduction in magnetic exchange interaction between the magnetic grains. Thus, transition noise in recording and reproducing characteristics can be reduced and a limit bit size can be reduced also. Conversely, since the magnetic exchange interaction between the magnetic grains is reduced in the granular-type recording layer, the dispersion of the inverse magnetic field tends to increase depending on components and sizes of the grains and such a structure causes increase of the transition noise and jitter noise in the recording and reproducing characteristics.

Furthermore, the lower limit value of the recording bit size is set depending largely on the size of the magnetic crystal grains of the granular-type recording layer. Thus, for increasing recording density of the HDD, the grains in the granular-type recording layer are required to be fine-grained. As a method for fining the grains in the granular-type recording layer, it is known to use a technique of using a underlayer having fine-grained crystal grains to fine the grains of the granular-type recording layer layered thereon. Here, for fining the grains of the underlayer, there are several possible methods such as manipulating the non-magnetic seed layer and making the underlayer granular.

DETAILED DESCRIPTION

Hereinafter, embodiments are described with reference to the drawings.

A perpendicular magnetic recording medium of the present embodiment includes: a non-magnetic substrate; orientation control layer formed on the non-magnetic substrate, the orientation control layer consisting of nickel alloy having fcc structure; non-magnetic buffer layer formed on the orientation control layer, the non-magnetic buffer layer containing silver having fcc structure; non-magnetic seed layer formed on the non-magnetic buffer layer, the non-magnetic seed layer consisting of silver particles of fcc structure and grain boundaries of amorphous germanium between the silver particles; non-magnetic intermediate layer formed on the non-magnetic seed layer, the non-magnetic intermediate layer consisting of ruthenium or ruthenium alloy; and perpendicular magnetic recording layer formed on the non-magnetic intermediate layer.

In the perpendicular magnetic recording medium of the present embodiment, the orientation control layer and the non-magnetic buffer layer are formed in contact with each other, and the non-magnetic buffer layer and the non-magnetic seed layer are formed in contact with each other.

Figure 1:
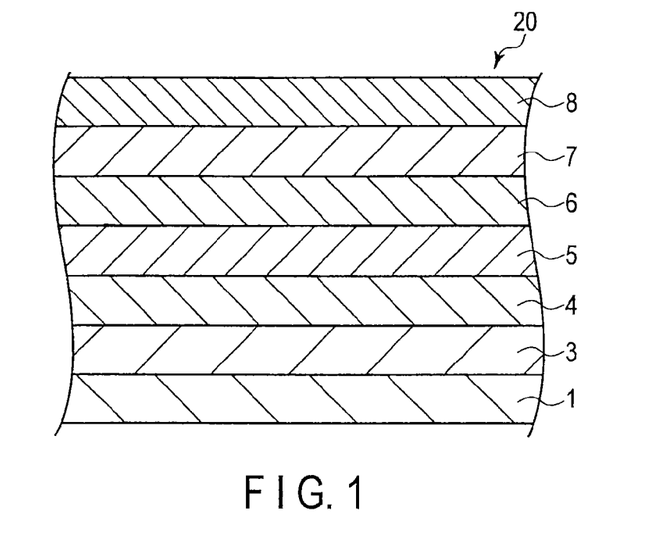
FIG. 1 is a sectional view showing a structural example of a perpendicular magnetic recording medium of the embodiments.

FIG. 1 shows a sectional view of a structure of the perpendicular magnetic recording medium of the embodiment.

As shown therein, the perpendicular magnetic recording medium 20 includes the following layers formed on the substrate 1 in the following order: a soft magnetic layer 3; orientation control layer 4 consisting of nickel alloy having fcc structure; non-magnetic buffer layer 5 containing silver having fcc structure; non-magnetic seed layer 6 consisting of silver particles of fcc structure and grain boundaries of amorphous germanium between the silver particles; non-magnetic intermediate layer 7; and perpendicular magnetic recording layer 8.

According to the embodiment, crystal orientation in the perpendicular magnetic recording layer can be improved with the orientation control layer and the non-magnetic buffer layer. Grain size dispersion in the perpendicular magnetic recording layer can be reduced with the non-magnetic seed layer. Furthermore, excellent crystal orientation and low grain size dispersion can be achieved at the same time in the perpendicular magnetic recording layer with the orientation control layer, non-magnetic buffer layer, and non-magnetic seed layer formed in this order while contacting each other, and consequently, medium noises can be reduced.

As a material for the non-magnetic buffer layer, Ag having fcc structure can be used. Here, one or two additive metals selected from the group consisting of Ni, Ge, Hf, and Ti may be added to Ag. Furthermore, the non-magnetic buffer layer may contain a grain boundary layer including crystal grains having fcc structure whose main ingredient is Ag and one or two additive metals selected from the group consisting of Ni, Ge, Hf, and Ti to surround the crystal grains.

If the additive metals are added to Ag, the additive metal content with respect to the whole Ag content is set between 10 at % and 70 at % inclusive. Below 10 at %, the benefit of the additive metals tends to be unobtainable. Above 70 at %, the crystalline structure of Ag particles is damaged due to excessive additive metal content and the crystal orientation tends to be deteriorated. Furthermore, the additive metal content may be limited to a range between 20 at % and 60 at % inclusive.

The non-magnetic buffer layer is formed using sputtering process performed at pressure between 0.5 and 1.0 Pa under inert atmosphere. On the other hand, the non-magnetic seed layer is formed using sputtering process performed at pressure between 0.05 and 0.3 Pa under inert atmosphere. Through these processes, the layers can consist of columnar Ag particles whose grain size dispersion is small and Ge grain boundaries surrounding the Ag particles.

In the non-magnetic seed layer, the germanium content is set between 55 at % and 70 at % inclusive. Below 55 at %, the Ag particles are coupled to each other due to a shortage of grain boundary substance, and consequently, the grain size dispersion tends to be insufficient. Above 70 at %, the crystalline structure of Ag particles is damaged due to excessive grain boundary substance, and consequently, the crystal orientation tends to be deteriorated.

As materials for the orientation control layer, Ni having fcc structure and at least one element selected from the group consisting of W, Cr, Carbon, Mo, and V may be used. The metal content added to Ni is set between 5 at % and 30 at % inclusive. Below 5 at %, Ni gains magnetism which becomes magnetic noise, and consequently, recording and reproducing characteristics are deteriorated. Above 30 at %, Ni alloy cannot hold fcc structure and becomes amorphous structure, and consequently, the crystal orientation tends to be deteriorated.

As a substrate applicable to the embodiment, a glass substrate, Al alloy substrate, ceramic substrate, carbon substrate, and Si monocrystal substrate having an oxidation surface are available. The glass substrate may be an amorphous glass or a crystallization glass, for example. The amorphous glass may be a conventional soda lime glass or an aluminosilicate glass, for example. The crystallization glass may be a lithium crystallization glass, for example. The ceramic substrate may be a sintered material whose main ingredient is conventional aluminum oxide, aluminum nitride and silicon nitride, or a fiber reinforced material of the same. As the substrate, the above-mentioned metal substrate or non-metal substrate on which a thin film of NiP and the like is formed by plating method or sputtering method may be used. Instead of sputtering method, vacuum evaporation or electrolytic plating can be used to obtain the same effect.

Between the non-magnetic substrate and the magnetic recording layer, an adhesion layer, soft magnetic underlayer (SUL), and non-magnetic underlayer may be interposed additionally.

The adhesion layer is provided to increase the adhesion between the substrate and the layer thereupon. As materials for the adhesion layer, substances having amorphous structure such as Ti, Ta, W, Cr, and Pt, alloy containing such substances, or oxide of or nitride of such substances can be used.

The thickness of the adhesion layer may be set in a range between, for example, 5 and 30 nm inclusive.

Below 5 nm, the adhesion is not sufficient and the film tends to be pealed off easily. Above 30 nm, the time for process becomes too long and throughput tends to be poor.

The SUL functions as a part of a magnetic head by passing a recording magnetic field from a monomagnetic pole head used to magnetize the perpendicular magnetic recording layer in a horizontal direction and returning the recording magnetic field to the magnetic head side. The SUL thus applies the steep and sufficient perpendicular magnetic field to the recording layer of the magnetic field and provides efficient recording and reproducing characteristics. As the soft magnetic underlayer, materials containing Co, Fe, or Ni may be used. Specifically, a Co alloy containing Co and at least one of Zr, Hf, Nb, Ta, Ti, and Y may be used. The Co alloy may contain Co more than 80 at %. On such a Co alloy, an amorphous layer is easily formed when sputtering method is adopted for forming the film. In the amorphous soft magnetic material, there is no crystal magnetic anisotropy, crystal defect, or grain boundary. Therefore, the amorphous soft magnetic material exerts highly superior soft magnetism and reduces the medium noises. As the amorphous soft magnetic materials, CoZr, CoZrNb, and CoZrTa alloys are available, for example. Other materials for the soft magnetic underlayer may be a CoFe alloy such as CoFe, and CoFeV, FeNi alloy such as FeNi, FeNiMo, FeNiCr, and FeNiSi, FeAl and FeSi alloy such as FeAl, FeAlSi, FeAlSiCr, FeAlSiTiRu, and FeAlO, FeTa alloy such as FeTa, FeTaC, and FeTaN, and FeZr alloy such as FeZrN. Furthermore, materials having microcrystal structure such as FeAlO, FeMgO, FeTaN, and FeZrN in which Fe is contained 60 at % or more, or materials having granular structure including fine crystal grains dispersed in a matrix may be used.

The thickness of the soft magnetic underlayer may be set in a range between, for example, 10 and 100 nm inclusive.

Below 10 nm, recording magnetic field from the recording head is not sufficiently taken in the soft magnetic underlayer and recording and reproducing efficiency tends to be suppressed. Above 100 nm, the time for process becomes too long and throughput tends to be poor.

Furthermore, the soft magnetic underlayer can be divided into a plurality of layers for spike noise prevention and non-magnetic dividing layers of 0.5 to 1.5 nm are interposed therebetween for antiferromagnetic coupling. As the non-magnetic dividing layer, Ru, Ru alloy, Pd, Cu, and Pt are available, for example. Furthermore, exchange coupling can be established between the soft magnetic underlayer and a hard magnetic film such as CoCrPt, SmCo, and FePt having in-plane anisotropy or a pin layer consisting of an antiferromagnetic material such as IrMn and PtMn. To control exchange coupling force, magnetic films of Co and the like or non-magnetic films of Pt and the like may be layered over and under the non-magnetic dividing layers.

The main ingredients of the magnetic recording layer applicable to the present embodiment are either iron or cobalt and platinum. Furthermore, the magnetic recording layer may be a perpendicular magnetic recording layer having magnetic anisotropy perpendicular to a substrate. In case of densification, external magnetic field from a recording dot works in a direction maintaining signals of surrounding recording dots in the perpendicular magnetic recording layer, and thus, signal vanishing due to thermal decay can be prevented and densification can be achieved smoothly.

The thickness of the magnetic recording layer may be set in a range between, for example, 3 and 30 nm inclusive, or more specifically, 5 and 15 nm inclusive. Within this range, a magnetic recording and reproducing apparatus which is much excellent in recording density can be manufactured. If the thickness of the magnetic recording layer is below 3 nm, reproduction output is too low and noise component tends to be more than the reproduction output. If the thickness of the magnetic recording layer is above 30 nm, reproduction output is too high and waveform tends to be distorted thereby. The magnetic recording layer may be formed as a combination of two or more layers, and in that case, the total thickness of the combination of layers is set within the above-mentioned range. The coercive force of the magnetic recording layer is 237000 A/m (30000 e) or more. If the coercive force is below 237000 A/m (30000 e), the thermal decay resistance tends to be deteriorated. The perpendicular squareness ratio of the magnetic recording layer is 0.8 or more. If the perpendicular squareness ratio is below 0.8, the thermal decay resistance tends to be deteriorated.

In the granular-type recording layer using Co, the Pt content in the magnetic recording layer is set in a range between 10 at % and 25 at % inclusive. From this range of the Pt content, a uniaxial crystal magnetic anisotropy constant (Ku) which is necessary for the magnetic recording layer can be obtained, crystal orientation of magnetic particles can be improved, and consequently, good thermal decay resistance and good recording and reproducing characteristics for high density recording can be achieved. If the Pt content is set above or below this range, sufficient Ku for the thermal decay resistance for high density recording may be unobtainable.

The protective film applicable to the embodiment is for the purpose of preventing damage to the magnetic recording layer due to corrosion and damage to the medium surface due to a contact of the magnetic head to the medium. A material for protective film may be a substance including C. The thickness of the protective film is set in a range between 1 to 10 nm inclusive, for example. Within this range, a distance between the head and the medium can be shortened and thus, high density recording is performable. Carbon used here may be classified as $sp^2$ coupling carbon (graphite) or $sp^3$ coupling carbon (diamond). $Sp^3$ coupling carbon is superior to graphite in both durability and corrosion resistance, but is inferior to graphite in surface smoothness due to its crystalline condition. In general, a carbon film is formed based on the sputtering method using the graphite target. Through this process, an amorphous carbon in which $sp^2$ coupling carbon and $sp^3$ coupling carbon are mixed is produced. The amorphous carbon in which $sp^3$ coupling carbon content is richer is called diamond-like carbon (DLC) which is excellent in durability and corrosion resistance, and is also excellent in surface smoothness because of its amorphous structure. Thus, DLC is used as a surface protective film for a magnetic recording medium. In chemical-vapor deposition (CVD) method for producing DLC, excitation and decomposition of material gas are performed in plasma and DLC is generated by chemical reaction. Thus, if certain conditions are met, DLC with richer $sp^3$ coupling carbon content can be produced.

The materials for the non-magnetic intermediate layer may be Ru or an alloy of Ru and at least one metal selected from the group consisting of Cr, Mo, Co, Mn, and Si.

A magnetic recording and reproducing apparatus of other embodiments includes a perpendicular magnetic recording medium including: a non-magnetic substrate; orientation control layer formed on the non-magnetic substrate, the orientation control layer consisting of nickel alloy having fcc structure; non-magnetic buffer layer formed on the orientation control layer, the non-magnetic buffer layer containing silver having fcc structure; non-magnetic seed layer formed on the non-magnetic buffer layer, the non-magnetic seed layer consisting of silver particles of fcc structure and grain boundaries of amorphous germanium between the silver particles; non-magnetic intermediate layer formed on the non-magnetic seed layer, the non-magnetic intermediate layer consisting of ruthenium or ruthenium alloy; and perpendicular magnetic recording layer formed on the non-magnetic intermediate layer, and the apparatus includes a magnetic head having an information recording device and a recorded information reproducing device.

Figure 2:
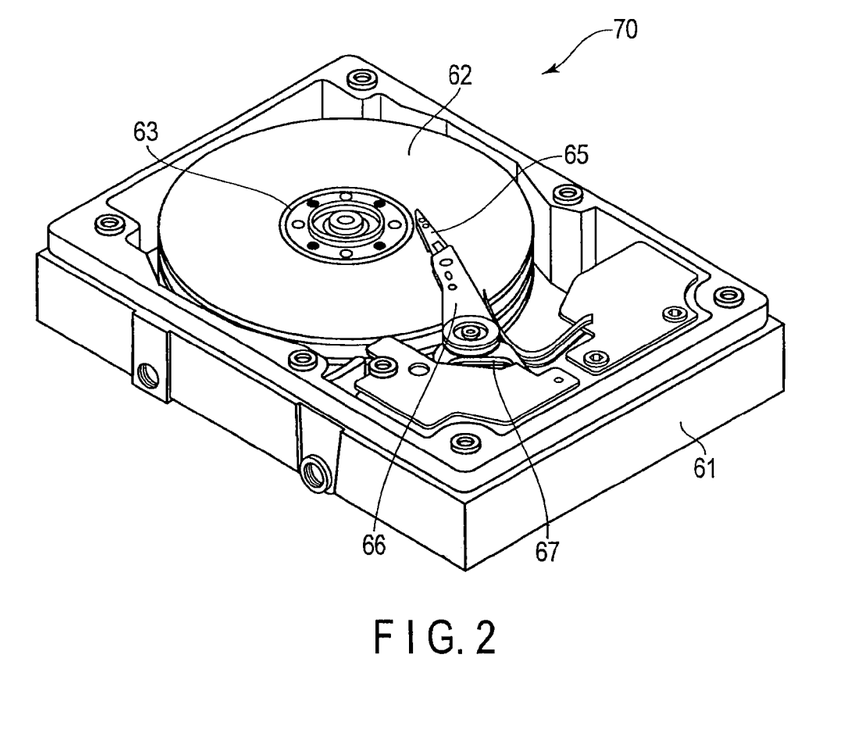
FIG. 2 is a perspective view showing an example of a magnetic recording and reproducing apparatus of the embodiments in a partially-disassembled fashion.

FIG. 2 is a perspective view showing an example of a magnetic recording and reproducing apparatus of the present embodiment in a partially-disassembled fashion.

In the magnetic recording and reproducing apparatus 70 of the present embodiment, a rigid structure magnetic disk 62 for recording information is installed in a spindle 63 and is rotated at a constant rotation rate by a spindle motor (not shown). A magnetic head configured to record and reproduce information by accessing the magnetic disk 62 is mounted on a slider which is attached to a tip of a suspension 65 of a thin plate-shaped flat spring. The suspension 65 is connected to one end of an arm 66 including, for example, a bobbin supporting a drive coil (not shown).

A voice coil motor 67 which is a kind of a linear motor is disposed on the other end of the arm 66. The voice coil motor 67 includes a magnetic circuit in which a drive coil (not shown) wound around the bobbin of the arm 66 is sandwiched by a permanent magnet and an opposite yoke facing each other.

The arm 66 is supported by ball bearings (not shown) provided over and under a fixing axis and is rotated and slide by the voice coil motor 67. That is, the position of slider 64 on the magnetic disk 62 is controlled by the voice coil motor 67.

EXAMPLES

Example 1 and Comparative examples 1 to 10

Figure 3:
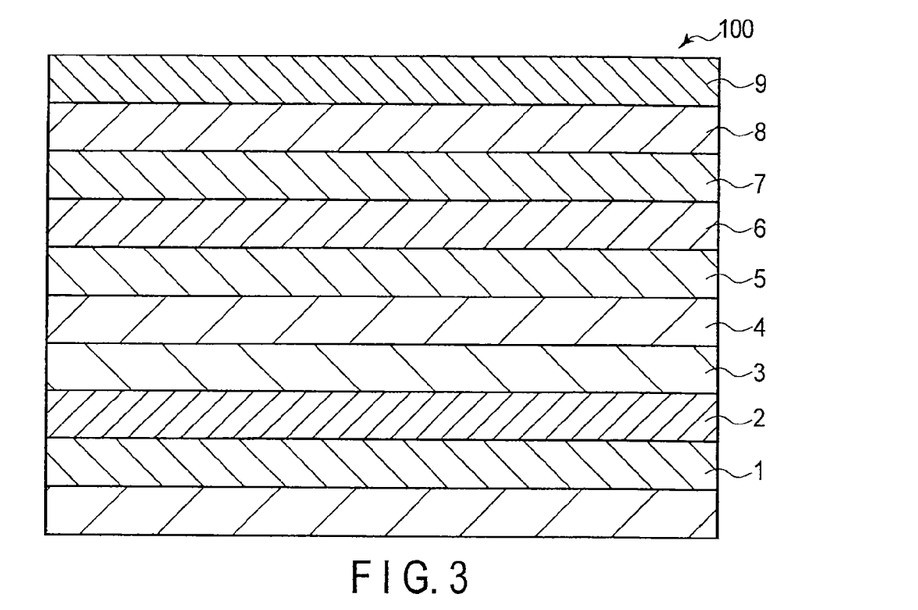
FIG. 3 is a sectional view schematically showing an example of the perpendicular magnetic recording medium of the embodiments.
Figure 4:
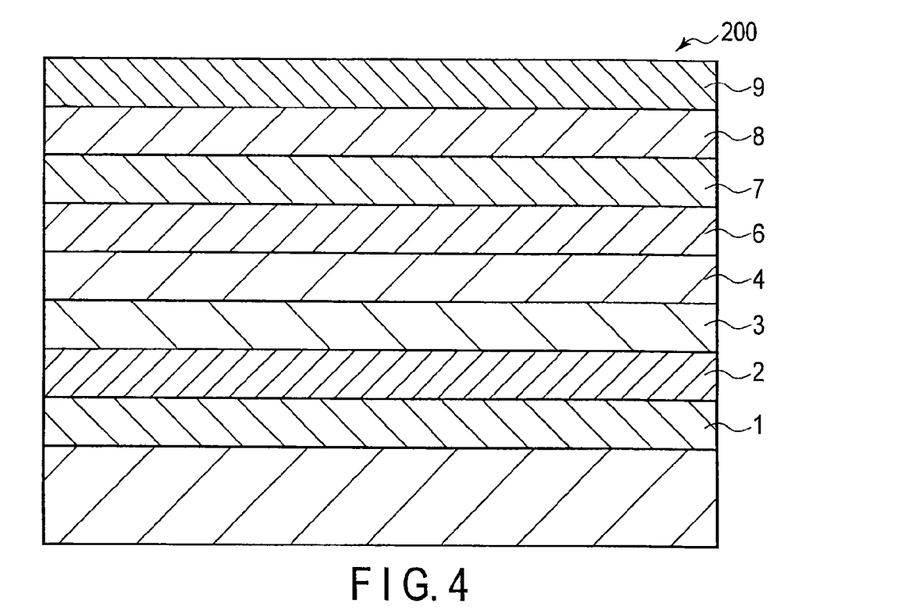
FIG. 4 is a sectional view schematically showing an example of a comparative perpendicular magnetic recording medium.
Figure 5:
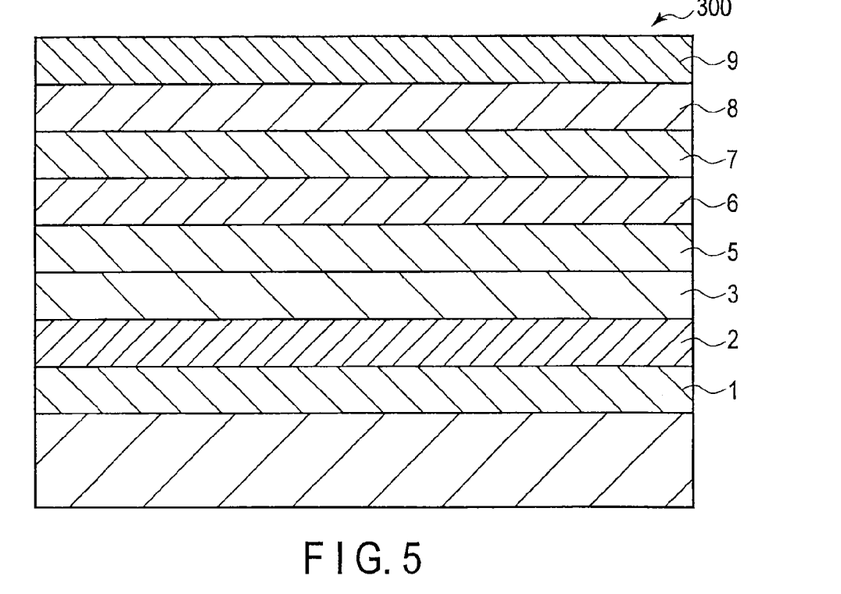
FIG. 5 is a sectional view schematically showing another example of a comparative perpendicular magnetic recording medium.
Figure 6:
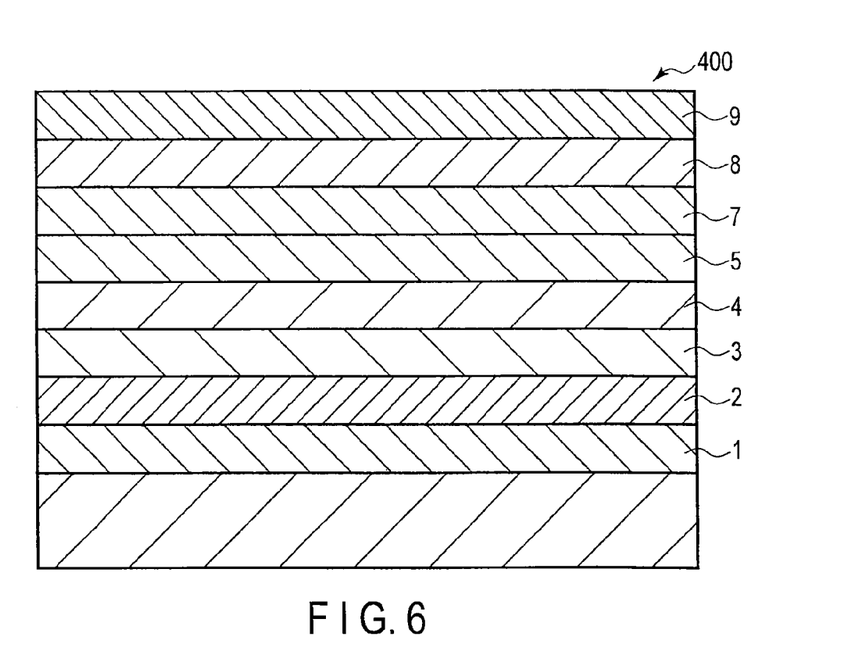
FIG. 6 is a sectional view schematically showing another example of a comparative perpendicular magnetic recording medium.
Figure 7:
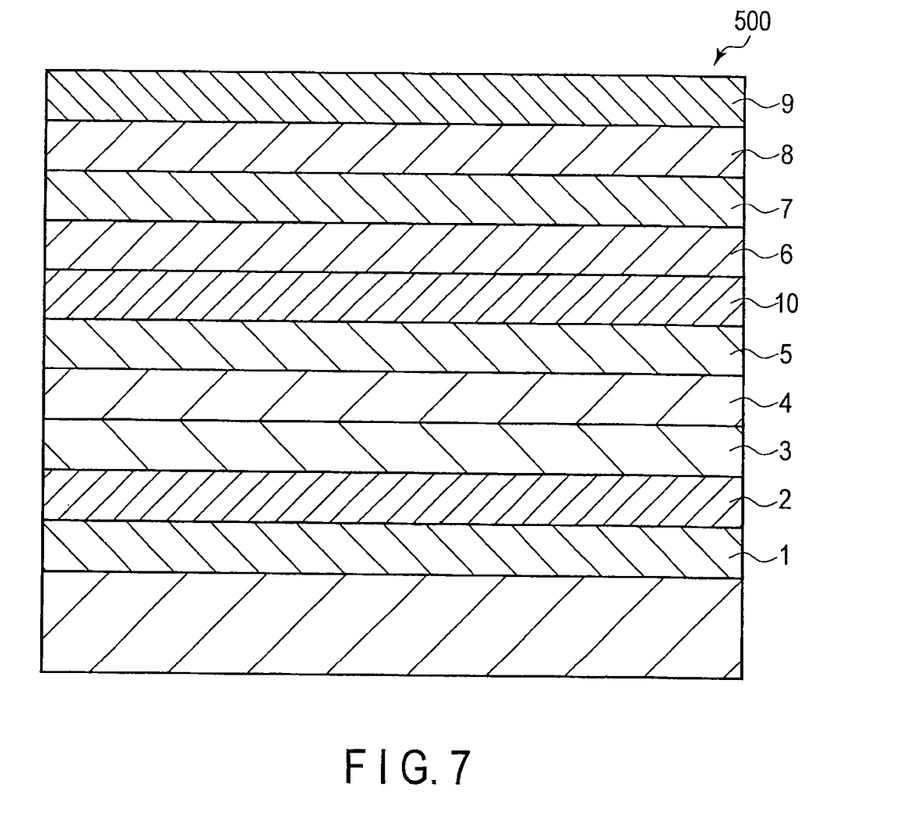
FIG. 7 is a sectional view schematically showing another example of a comparative perpendicular magnetic recording medium.
Figure 8:
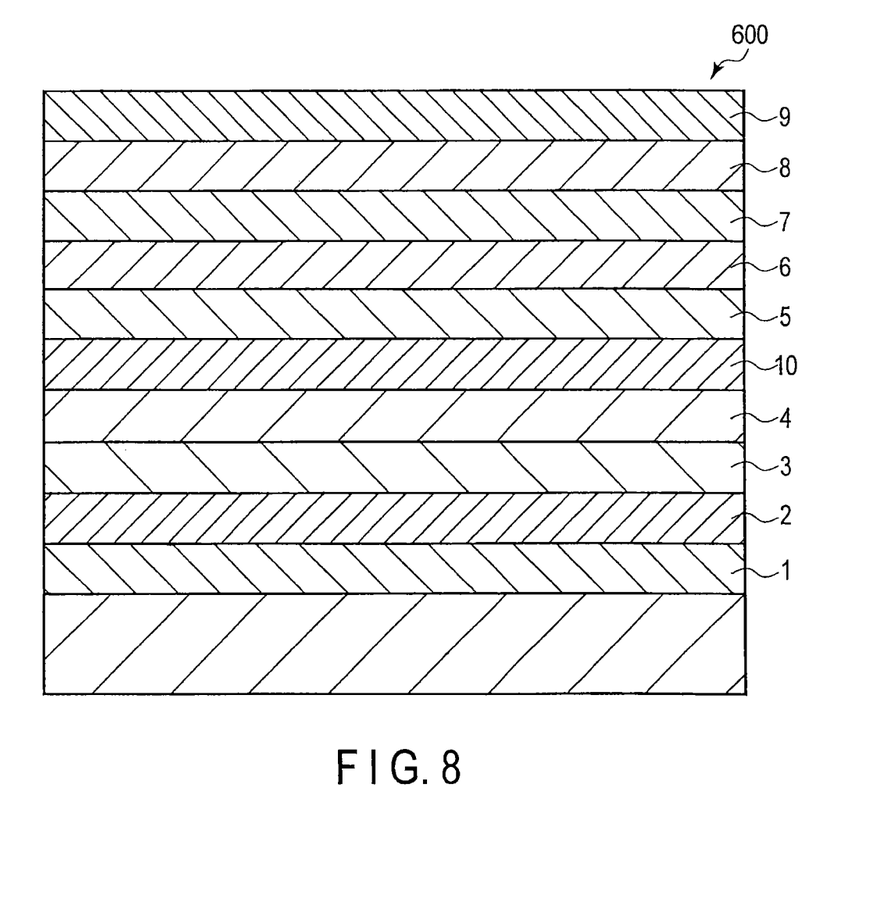
FIG. 8 is a sectional view schematically showing another example of a comparative perpendicular magnetic recording medium.

FIG. 3 is a sectional view schematically showing a perpendicular magnetic recording medium of Example 1. FIG. 4 is a sectional view schematically showing a perpendicular magnetic recording medium of Comparative example 1, and similarly, FIG. 5 schematically shows that of Comparative example 2, FIG. 6 schematically shows that of Comparative example 3, and FIG. 7 schematically shows that of Comparative example 4, and FIG. 8 schematically shows that of Comparative example 5.

As shown in FIG. 3, the magnetic recording medium of the present embodiment was manufactured in the following manner. Non-magnetic glass substrate 1 (KONICA MINOLTA, amorphous substrate MEL6, 2.5 inches in diameter) was placed in a film forming chamber of DC magnetron sputtering apparatus (CANON-ANELVA, C-3010), and air was exhausted from the chamber to the degree of vacuum of $1\times10^{-5}$ Pa. Then, Ar gas was introduced in the chamber so as to set gas pressure 0.7 Pa, and Cr-25 at % Ti layer whose thickness was 10 nm was formed on the substrate 1 at DC500W as an adhesion layer 2.

Then, Co-20 at % Fe-7 at % Ta-5 at % Zr layer whose thickness was 40 nm was formed at DC500w as a soft magnetic layer 3.

Then, Ni-5 at % W layer whose thickness was 5 nm was formed at DC500W as an orientation control layer 4.

Furthermore, a non-magnetic buffer layer 5 consisting of Ag whose thickness was 3 nm was formed at DC500W.

Next, Ar gas was introduced in the chamber so as to set gas pressure 0.1 Pa, and Ag-60 at % Ge layer whose thickness was 5 nm was formed at DC100W as a non-magnetic seed layer 6. Then, Ar gas was introduced in the chamber so as to set gas pressure 0.7 Pa again, and Ru layer whose thickness was 15 nm was formed at DC500W as a non-magnetic intermediate layer 7.

Then, (Co-18 at % Pt-14 at % Cr)-10 mol % $SiO_2$ layer whose thickness was 12 nm was formed at DC500W as a perpendicular magnetic recording layer 8. Then, a DLC protective layer 9 whose thickness was 2.5 nm was formed thereon using CVD method.

Lastly, a lubricant agent (not shown) was applied thereon by dipping method to acquire a perpendicular magnetic recording medium 100 of the embodiment.

As shown in FIG. 4, a perpendicular magnetic recording medium 200 of Comparative example 1 was manufactured by adopting the manufacturing method of Example 1 except that the Ag buffer layer 5 was omitted therefrom.

As shown in FIG. 5, a perpendicular magnetic recording medium 300 of Comparative example 2 was manufactured by adopting the manufacturing method of Example 1 except that the NiW orientation control layer 4 was omitted therefrom.

As shown in FIG. 6, a perpendicular magnetic recording medium 400 of Comparative example 3 was manufactured by adopting the manufacturing method of Example 1 except that the AgGe non-magnetic seed layer 6 was omitted therefrom.

As shown in FIG. 7, a perpendicular magnetic recording medium 500 of Comparative example 4 was manufactured by adopting the manufacturing method of Example 1 except that a Ta underlayer 10 was interposed between the Ag buffer layer 5 and the AgGe non-magnetic seed layer 6.

As shown in FIG. 8, a perpendicular magnetic recording medium 600 of Comparative example 5 was manufactured by adopting the manufacturing method of Example 1 except that a Ta underlayer 10 was interposed between the NiW orientation control layer 4 and the Ag buffer layer 5.

Furthermore, a perpendicular magnetic recording medium of each of Comparative examples 6 to 10 was manufactured by adopting the manufacturing method of Example 1 except that the materials for the buffer layer 5 were changed as shown in Table 1 below.

The section of perpendicular magnetic recording medium of each of Comparative examples 6 to 10 is illustrated the same as FIG. 1.

Here, layering structure (ascending order) of each of Example 1 and Comparative examples 1 to 10 is described.

Example 1 and Comparative Examples 6 to 10

Non-magnetic glass substrate 1/CrTi adhesion layer 2/CoFeTaZr soft magnetic layer 3/NiW orientation control layer 4/Ag buffer layer 5/AgGe non-magnetic seed layer 6/Ru non-magnetic intermediate layer 7/CoCrPt—$SiO_2$ perpendicular magnetic recording layer 8/C protective layer 9

Comparative Example 1

Non-magnetic glass substrate 1/CrTi adhesion layer 2/CoFeTaZr soft magnetic layer 3/NiW orientation control layer 4/AgGe non-magnetic seed layer 6/Ru non-magnetic intermediate layer 7/CoCrPt—$SiO_2$ perpendicular magnetic recording layer 8/C protective layer 9

Comparative Example 2

Non-magnetic glass substrate 1/CrTi adhesion layer 2/CoFeTaZr soft magnetic layer 3/Ag buffer layer 5/AgGe non-magnetic seed layer 6/Ru non-magnetic intermediate layer 7/CoCrPt—$SiO_2$ perpendicular magnetic recording layer 8/C protective layer 9

Comparative Example 3

Non-magnetic glass substrate 1/CrTi adhesion layer 2/CoFeTaZr soft magnetic layer 3/NiW orientation control layer 4/Ag buffer layer 5/Ru non-magnetic intermediate layer 7/CoCrPt—$SiO_2$ perpendicular magnetic recording layer 8/C protective layer 9

Comparative Example 4

Non-magnetic glass substrate 1/CrTi adhesion layer 2/CoFeTaZr soft magnetic layer 3/NiW orientation control layer 4/Ag buffer layer 5/Ta underlayer 10/AgGe non-magnetic seed layer 6/Ru non-magnetic intermediate layer 7/CoCrPt—$SiO_2$ perpendicular magnetic recording layer 8/C protective layer 9

Comparative Example 5

Non-magnetic glass substrate 1/CrTi adhesion layer 2/CoFeTaZr soft magnetic layer 3/NiW orientation control layer 4/Ta underlayer 10/Ag buffer layer 5/AgGe non-magnetic seed layer 6/Ru non-magnetic intermediate layer 7/CoCrPt—$SiO_2$ perpendicular magnetic recording layer 8/C protective layer 9

The medium of each of Example 1 and Comparative examples 1 to 10 was analyzed as below and its characteristics were evaluated.

Firstly, both the non-magnetic seed layer and the perpendicular magnetic recording layer were subjected to a transmission electron microscopy (TEM) measurement to measure their grain structures in a film plane direction. Furthermore, components of particles and grain boundaries were analyzed using an energy-dispersive X-ray spectroscope (TEM-EDX).

Based on the results of measurements by planar TEM analysis, the grain sizes of the non-magnetic seed layer and the perpendicular magnetic recording layer were analyzed in the following manner. From the planar TEM images taken at a magnification range between five hundred thousand and two million times, optional images in which the number of grains was estimated at least 100 or more were taken into a computer as image information. The image information was then subjected to image processing to extract an outline of each crystal grain. Then, a diameter passing the barycenter and two points on the outer rim of the crystal grain was measured at an interval of 2 degrees for each grain, and then, an average of the measured values was calculated to acquire average grain size and grain size dispersion of the crystal grains. Here, a line connecting barycenters of two adjacent grains was measured for each pair of grains and an average value of the measured grain boundary widths was set as a grain boundary width.

Table 1 shows the results of grain size analysis of Example 1 and Comparative examples 1 to 10. In each of the medium of Example 1 and the media of Comparative examples 1, 2, and 4 to 10 (except Comparative example 3), it was found that the AgGe film of the non-magnetic seed layer consisted of crystalline Ag particles whose average grain size is approximately 6 nm and amorphous Ge grain boundary whose grain boundary width was approximately 2 nm. Therein, the grain size dispersion was 13.3%. Looking toward the medium of Comparative example 3, the non-magnetic buffer layer was made of Ag crystal grains those were in contact with each other, and grain boundary width was substantially zero. Here, the average grain size of Ag was 9 nm, and the grain size dispersion was 23.4%. Then, in each of the medium of Example 1 and the media of Comparative examples 1 to 10, it was found that the perpendicular magnetic recording layer consisted of crystalline CoCrPt particles and amorphous $SiO_2$ grain boundaries. The perpendicular magnetic recording layer of the medium of Example 1 showed excellent results such as average grain size of 6.8 nm, grain boundary width of approximately 1 nm, and grain size dispersion of 13.4%. That is, in the perpendicular magnetic recording layer of the medium of Example 1, the average grain size and the sum of the average grain size (6.8 nm) and the grain boundary width (1 nm), which is the pitch between the grains, are substantially the same as those of the non-magnetic seed layer (13 nm+2 nm), and the grain size dispersion (13.4%) is also substantially the same as that of the non-magnetic seed layer (13.3%). Thus, it was recognized that the structure of the non-magnetic seed layer was successfully transferred to the perpendicular magnetic recording layer.

On the other hand, the perpendicular magnetic recording layers of the media of Comparative examples 1, 2, and 4 to 10 showed the average grain sizes of 7.6 to 7.8 nm which were larger than those of the non-magnetic seed layers. Furthermore, the grain size dispersions were 18.1 to 18.2% which were worse than those of the non-magnetic seed layers. That is, in the media of Comparative examples 1, 2, and 4 to 10, the transfer of the particle structure from the non-magnetic seed layer to the perpendicular magnetic recording layer was found insufficient. In the perpendicular magnetic recording layer of the medium of Comparative example 3, the average grain size was 8.8 nm and the grain size dispersion was 22.8%. This means that the medium of Comparative example 3 exerts the grain size dispersion much worse than that of the medium of each of Example 1 and Comparative examples 1, 2, and 4 to 10.

Next, crystal orientation ($\Delta\theta 50$) of a perpendicular magnetic recording layer of each of these mediums was checked by measuring a rocking curve with an X-ray diffractometer (XRD) (SPECTRIS, Xpert-MRD). Table 1 shows results obtained from the measurement. It was found that the crystal orientation ($\Delta\theta 50$) of the perpendicular magnetic recording layer of the medium of Example 1 was excellent 3.1°.

On the other hand, the perpendicular magnetic recording layer of the medium of each of Comparative examples 1, 2, and 4 to 10 showed the crystal orientation (4050) above 10° which is much worse than that of Example 1. Note that the perpendicular magnetic recording layer of the medium of Comparative example 3 showed the crystal orientation ($\Delta\theta 50$) of excellent 3.2° which was substantially the same as that of Example 1.

Now, the recording and reproducing characteristics were evaluated in each of these mediums. The evaluation was performed using RWA1632 read-write analyzer and S1701MP spinstands of GUZIK, U.S.A. Furthermore, the evaluation was performed using a head including a shielded magnetic pole which is a single-poled magnetic pole with a shield (to converge the magnetic flux from the magnetic head) for writing, and a TMR device for reading, and adopting track recording density of 1400 kBPI for recording frequency.

Table 1 shows results obtained from the evaluation.

TABLE 1

| | | Orientation | | | | Low-sized | Perpendicular magnetic recording layer | | | |
|---|---|---|---|---|---|---|---|---|---|---|
| | Film structure | control layer Material | Base layer Material | Buffer layer Material | Base layer Material | grain dispersed seed layer Material | $\Delta\theta 50$ (deg) | Average grain size (nm) | Grain dispersion (%) | SNR (dB) |
| Example 1 | NiW/Ag/AgGe | NiW | — | Ag | — | AgGe | 3.1 | 6.8 | 13.4 | 22.1 |
| Comparative Example 1 | NiW/AgGe | NiW | — | — | — | AgGe | 11.8 | 7.6 | 18.1 | 17.4 |
| Comparative Example 2 | Ag/AgGe | — | — | Ag | — | AgGe | 11.6 | 7.7 | 18.2 | 17.3 |
| Comparative Example 3 | NiW/Ag | NiW | — | Ag | — | — | 3.2 | 8.8 | 22.8 | 18.8 |
| Comparative Example 4 | NiW/Ag/Ta/AgGe | NiW | — | Ag | Ta | AgGe | 13.1 | 7.8 | 18.1 | 16.1 |
| Comparative Example 5 | NiW/Ta/Ag/AgGe | NiW | Ta | Ag | — | AgGe | 11.7 | 7.7 | 18.2 | 17.5 |
| Comparative Example 6 | NiW/Ta/AgGe | NiW | — | Ta | — | AgGe | 13.2 | 7.7 | 18.2 | 16.3 |
| Comparative Example 7 | NiW/Pd/AgGe | NiW | — | Pd | — | AgGe | 11.8 | 7.6 | 18.2 | 17.3 |
| Comparative Example 8 | NiW/Pt/AgGe | NiW | — | Pt | — | AgGe | 11.9 | 7.7 | 18.1 | 17.2 |
| Comparative Example 9 | NiW/Ge/AgGe | NiW | — | Ge | — | AgGe | 13.4 | 7.7 | 18.1 | 16.4 |
| Comparative Example 10 | NiW/Ru/AgGe | NiW | — | Ru | — | AgGe | 11.9 | 7.8 | 18.2 | 17.1 |

As shown in Table 1, it was found that the medium of Example 1 of the present application exerted excellent 22.1 dB in the recording and reproducing characteristics as compared to that of the medium of each of Comparative examples 1 to 10.

To summarize, the media of Comparative examples 1, 2, and 4 to 10 showed the grain size dispersion of the perpendicular magnetic recording layer which was better than that of the Comparative example 3 but was slightly worse than that of Example 1, and showed the crystal orientation which was much worse than that of Example 1, namely, 10 deg. Furthermore, the medium of Comparative example 3 showed the crystal orientation which was substantially the same as that of Example 1 but showed the grain size dispersion above 20% which is much worse than that of Example 1. Therefore, none of the media of Comparative examples 1 to 10 could improve the grain size dispersion and the crystal orientation at the same time. The recording and reproducing characteristics of Comparative examples 1 to 10 were worse than those of Example 1. In contrast, it was recognized that the medium of Example 1 safely transferred the grain structure of the non-magnetic seed layer to the perpendicular magnetic recording layer and maintained improved crystal orientation so as to exert both low grain size dispersion and excellent crystal orientation at the same time. Consequently, the recording and reproducing characteristics were excellent in the medium of Example 1.

Comparative Examples 11 to 13

A perpendicular magnetic recording medium 800 of Comparative example 11 was manufactured by adopting the manufacturing method of Example 1 except that the layering order of NIW orientation control layer, Ag non-magnetic buffer layer, and AgGe non-magnetic seed layer was changed as shown in Table 2. Comparative examples 12 and 13 were manufactured in the same manner. Note that the first, second, and third layers in Table 2 correspond to the layers formed on the soft magnetic layer 3 firstly, secondly, and thirdly.

Here, layering structure (ascending order) of each of Comparative examples 11 to 13 is described.

Comparative Example 11

Non-magnetic glass substrate 1/CrTi adhesion layer 2/CoFeTaZr soft magnetic layer 3/Ag buffer layer 5/NiW orientation control layer 4/AgGe non-magnetic seed layer 6/Ru non-magnetic intermediate layer 7/CoCrPt—SiO$_2$ perpendicular magnetic recording layer 8/C protective layer 9

Comparative Example 12

Non-magnetic glass substrate 1/CrTi adhesion layer 2/CoFeTaZr soft magnetic layer 3/AgGe non-magnetic seed layer 6/NiW orientation control layer 4/Ag buffer layer 5/Ru non-magnetic intermediate layer 7/CoCrPt—SiO$_2$ perpendicular magnetic recording layer 8/C protective layer 9

Comparative Example 13

Non-magnetic glass substrate 1/CrTi adhesion layer 2/CoFeTaZr soft magnetic layer 3/Ag buffer layer 5/AgGe non-magnetic seed layer 6/NiW orientation control layer 4/Ru non-magnetic intermediate layer 7/CoCrPt—SiO$_2$ perpendicular magnetic recording layer 8/C protective layer 9

As done to Example 1, the medium of each of Comparative examples 11 to 13 was analyzed to measure the crystal orientation, average grain size of the perpendicular magnetic recording layer, and recording and reproducing characteristics.

TABLE 2

| | First layer Material | Second layer Material | Third layer Material | Perpendicular magnetic recording layer | | | SNR (dB) |
| | | | | Δθ50 (deg) | Average grain size (nm) | Grain dispersion (%) | |
| --- | --- | --- | --- | --- | --- | --- | --- |
| Comparative Example 11 | Ag buffer layer | NiW orientation control layer | AgGe seed layer | 12.6 | 7.8 | 18.4 | 16.8 |
| Comparative Example 12 | AgGe seed layer | NiW orientation control layer | Ag buffer layer | 6.2 | 8.7 | 22.9 | 17.9 |
| Comparative Example 13 | Ag buffer layer | AgGe seed layer | NiW orientation control layer | 5.8 | 9.2 | 23.1 | 17.5 |
| Example 1 | NiW orientation control layer | Ag buffer layer | AgGe seed layer | 3.1 | 6.8 | 13.4 | 22.1 |

As can be understood from Table 2, the medium of each of Comparative examples 11 to 13 showed the recording and reproducing characteristics which are deteriorated as compared to those of Example 1.

The deterioration mechanism of the medium of each of Comparative examples 11 to 13 is now explained. The results measured in Comparative example 11 are basically equal to those measured in Comparative example 2. This means that the layering order of Ag/NiW does not improve the crystal orientation of the AgGe film. The results measured in Comparative example 12 are basically equal to those measured in Comparative example 3. This means that the AgGe non-magnetic seed layer formed under the NiW/Ag layers does not transfer the low grain size dispersion structure. The results measured in Comparative example 13 are basically equal to those measured in Comparative example 3. This means that the AgGe non-magnetic seed layer formed under the Niw layer does not transfer the low grain size dispersion structure.

Examples 2 to 7

A perpendicular magnetic recording medium of each of Examples 2 to 7 was manufactured by adopting the manufacturing method of Example 1 except that the materials for the non-magnetic buffer layer were changed as shown in Table 3.

Here, layering structure (ascending order) of each of Examples 2 to 7 is described.

Examples 2 to 7

Non-magnetic glass substrate 1/CrTi adhesion layer 2/CoFeTaZr soft magnetic layer 3/NiW orientation control layer 4/Ag alloy buffer layer 5/AgGe non-magnetic seed layer 6/Ru non-magnetic intermediate layer 7/CoCrPt—SiO$_2$ perpendicular magnetic recording layer 8/C protective layer 9.

As done to Example 1, the medium of each of Examples 2 to 7 was analyzed to measure the crystal orientation, average grain size of the perpendicular magnetic recording layer, and recording and reproducing characteristics.

TABLE 3

| | | Perpendicular magnetic recording layer | | | |
|---|---|---|---|---|---|
| | Buffer layer Material | Δθ50 (deg) | Average grain size (nm) | Grain dispersion (%) | SNR (dB) |
| Example 2 | Ag—30at%Ni | 2.5 | 6.8 | 13.4 | 23.2 |
| Example 3 | Ag—30at%Hf | 2.7 | 6.7 | 13.5 | 22.7 |
| Example 4 | Ag—30at%Ti | 2.7 | 6.8 | 13.5 | 22.5 |
| Example 5 | Ag—30at%Ni—30at%Ge | 2.3 | 6.8 | 13.4 | 23.4 |
| Example 6 | Ag—30at%Hf—30at%Ge | 2.5 | 6.7 | 13.5 | 22.9 |
| Example 7 | Ag—30at%Ti—30at%Ge | 2.5 | 6.7 | 13.5 | 22.6 |

As can be understood from Table 3, the medium of each of Examples 2 to 7 showed the improved crystal orientation (Δθ50) of the perpendicular magnetic recording layer as compared to the medium of Example 1, and the recording and reproducing characteristics were thus better than those of Example 1.

Examples 8 to 12 and Comparative Examples 14 and 15

A perpendicular magnetic recording medium of each of Examples 8 to 12 and Comparative examples 14 and 15 was manufactured by adopting the manufacturing method of Example 1 except that the materials for the non-magnetic buffer layer were changed as shown in Table 4.

Here, layering structure (ascending order) of each of Examples 8 to 12 and Comparative examples 14 and 15 is described.

Examples 8 to 12 and Comparative examples 14 and 15

Non-magnetic glass substrate 1/CrTi adhesion layer 2/CoFeTaZr soft magnetic layer 3/NiW orientation control layer 4/Ag alloy buffer layer 5/AgGe non-magnetic seed layer 6/Ru non-magnetic intermediate layer 7/CoCrPt—SiO$_2$ perpendicular magnetic recording layer 8/C protective layer 9

As done to Example 1, the medium of each of Examples 8 to 12 and Comparative examples 14 and 15 was analyzed to measure the crystal orientation, average grain size of the perpendicular magnetic recording layer, and recording and reproducing characteristics.

TABLE 4

| | | Perpendicular magnetic recording layer | | | |
|---|---|---|---|---|---|
| | Buffer layer Material | Δθ50 (deg) | Average grain size (nm) | Grain dispersion (%) | SNR (dB) |
| Example 1 | Ag | 3.1 | 6.8 | 13.4 | 22.1 |
| Example 8 | Ag—20at%Ni | 2.7 | 6.8 | 13.4 | 22.8 |
| Example 9 | Ag—40at%Ni | 2.5 | 6.8 | 13.4 | 23.1 |
| Example 10 | Ag—60at%Ni | 2.5 | 6.9 | 13.4 | 23.1 |
| Comparative Example 14 | Ag—80at%Ni | 5.9 | 8.8 | 22.2 | 18.1 |
| Example 11 | Ag—10at%Ni—10at%Ge | 2.8 | 6.8 | 13.4 | 22.7 |
| Example 12 | Ag—20at%Ni—20at%Ge | 2.6 | 6.8 | 13.4 | 23 |
| Example 5 | Ag—30at%Ni—30at%Ge | 2.3 | 6.8 | 13.4 | 23.4 |
| Comparative Example 15 | Ag—40at%Ni—40at%Ge | 6.2 | 8.9 | 22.8 | 17.9 |

As can be understood from Table 4, the medium of each of Examples 8 to 12 showed the improved crystal orientation (Δθ50) of the perpendicular magnetic recording layer as compared to the medium of Example 1, and the recording and reproducing characteristics were thus better than those of Example 1. In contrast, the medium of each of Comparative examples 14 and 15 showed the grain size dispersion of the perpendicular magnetic recording layer which was deteriorated as compared to those of each of Example 1, 5, and 8 to 12, and thus, the recording and reproducing characteristics were deteriorated as well. It is considered that this deterioration was caused by too much amount of the additive added in the Ag non-magnetic buffer layer.

Examples 13 to 16

A perpendicular magnetic recording medium of each of Examples 13 to 16 was manufactured by adopting the manufacturing method of Example 1 except that the materials for the orientation control layer were changed to Ni alloys as shown in Table 5.

Here, layering structure (ascending order) of each of Examples 13 to 16 is described.

Examples 13 to 16

Non-magnetic glass substrate 1/CrTi adhesion layer 2/CoFeTaZr soft magnetic layer 3/Ni alloy orientation control layer 4/Ag alloy buffer layer 5/AgGe non-magnetic seed layer 6/Ru non-magnetic intermediate layer 7/CoCrPt—SiO$_2$ perpendicular magnetic recording layer 8/C protective layer 9

As done to Example 1, the medium of each of Examples 13 to 16 was analyzed to measure the crystal orientation, average grain size of the perpendicular magnetic recording layer, and recording and reproducing characteristics.

TABLE 5

| | | Perpendicular magnetic recording layer | | |
|---|---|---|---|---|
| Orientation control layer Material | Δθ50 (deg) | Average grain size (nm) | Grain dispersion (%) | SNR (dB) |
| Example 1 | Ni—5at%W | 3.1 | 6.8 | 13.4 | 22.1 |
| Example 13 | Ni—5at%C | 3.2 | 6.8 | 13.4 | 22 |
| Example 14 | Ni—20at%Cr | 3.1 | 6.8 | 13.4 | 22.1 |
| Example 15 | Ni—10at%Mo | 3.3 | 6.8 | 13.4 | 21.9 |
| Example 16 | Ni—10at%V | 3.4 | 6.8 | 13.4 | 21.8 |

As can be understood from Table 5, the medium of each of Examples 13 to 16 showed the characteristics substantially the same as those of the medium of Example 1.

Examples 17 and 18 and Comparative Examples 16 and 17

A perpendicular magnetic recording medium of each of Examples 17 and 18 and Comparative examples 16 and 17 was manufactured by adopting the manufacturing method of Example 1 except that the pressure used to form the non-magnetic seed layer was varied in a range between 0.01 Pa to 1.0 Pa as shown in Table 6. Note that pressure of 0.01 Pa was too low to create sputtering discharge and the non-magnetic seed layer was not formed in the first place. Thus, the 0.01 Pa case was omitted from Table 6.

Here, layering structure (ascending order) of each of Examples 17 and 18 and Comparative examples 16 and 17 is described.

Examples 17 and 18 and Comparative Examples 16 and 17

Non-magnetic glass substrate 1/CrTi adhesion layer 2/CoFeTaZr soft magnetic layer 3/NiW orientation control layer 4/Ag buffer layer 5/AgGe non-magnetic seed layer 6/Ru non-magnetic intermediate layer 7/CoCrPt—SiO$_2$ perpendicular magnetic recording layer 8/C protective layer 9

As done to Example 1, the medium of each of Examples 17 and 18 and Comparative examples 16 and 17 was analyzed to measure the crystal orientation, average grain size of the perpendicular magnetic recording layer, and recording and reproducing characteristics.

TABLE 6

| | Non magnetic seed layer Material (pressure) | Perpendicular magnetic recording layer | | | |
|---|---|---|---|---|---|
| | | Δθ50 (deg) | Average grain size (nm) | Grain dispersion (%) | SNR (dB) |
| Example 17 | AgGe(0.05 Pa) | 2.8 | 6.5 | 13.4 | 22.6 |
| Example 1 | AgGe(0.1 Pa) | 3.1 | 6.8 | 13.4 | 22.1 |
| Example 18 | AgGe(0.3 Pa) | 3.3 | 7.2 | 13.4 | 21.6 |
| Comparative Example 16 | AgGe(0.5 Pa) | 5.2 | 10.6 | 18.3 | 19.2 |
| Comparative Example 17 | AgGe(0.7 Pa) | 6 | 12.3 | 20.2 | 18.9 |
| Comparative Example 18 | AgGe(1.0 Pa) | 6.8 | 13.1 | 22.4 | 18.1 |

As can be understood from Table 6, when the film forming pressure is in a range between 0.05 and 0.3 Pa, the medium of each of Examples showed excellent grain size dispersion and recording and reproducing characteristics as compared to those of the medium of each of Comparative examples.

Examples 19 and 21 and Comparative Examples 19 and 24

A perpendicular magnetic recording medium of each of Examples 19 and 21 and Comparative examples 19 and 24 was manufactured by adopting the manufacturing method of Example 1 except that the non-magnetic seed layer 6 was formed with Ge content varying in a range between 40 at % and 85 at % as shown in Table 7.

Here, layering structure (ascending order) of each of Examples 19 and 21 and Comparative examples 19 and 24 is described.

Examples 19 and 21 and Comparative Examples 19 and 24

Non-magnetic glass substrate 1/CrTi adhesion layer 2/CoFeTaZr soft magnetic layer 3/NiW orientation control layer 4/Ag buffer layer 5/AgGe non-magnetic seed layer 6/Ru non-magnetic intermediate layer 7/CoCrPt—SiO$_2$ perpendicular magnetic recording layer 8/C protective layer 9

The non-magnetic seed layer of each medium was subjected to a planer TEM analysis.

TABLE 7

| | Non-magnetic seed layer Material | SNR (dB) |
|---|---|---|
| Example 19 | Ag—55at%Ge | 21.8 |
| Example 1 | Ag—60at%Ge | 22.1 |
| Example 20 | Ag—65at%Ge | 21.9 |
| Example 21 | Ag—70at%Ge | 21.3 |
| Comparative Example 19 | Ag—40at%Ge | 18.2 |
| Comparative Example 20 | Ag—45at%Ge | 18.5 |
| Comparative Example 21 | Ag—50at%Ge | 18.6 |
| Comparative Example 22 | Ag—75at%Ge | 14.9 |
| Comparative Example 23 | Ag—80at%Ge | 14.5 |
| Comparative Example 24 | Ag—85at%Ge | 14 |

In the non-magnetic seed layer of the medium of each of Examples 1 and 19 to 21, the AgGe film consisted of crystalline Ag particles whose particle sizes are approximately 5 to 6 nm and amorphous Ge grain boundaries whose grain boundary widths are approximately 1 to 2 nm. The grain size dispersion was low at approximately 13 to 14%. On the other hand, the medium of the non-magnetic seed layer of each of Comparative examples 19 to 21 showed such a structure that several Ag particles were apparently connected to each other. It is considered that such a structure was created since the amount of grain boundary substance Ge in the layer was too little to cut the Ag particles sufficiently. Looking to the non-magnetic seed layer of the medium of each of Comparative examples 22 to 24, it was found that the AgGe film has amorphous structure. It is considered that such a structure was created since the amount of grain boundary material Ge in the layer was too much and the grain structure was damaged thereby. As can be understood from Table 7, the medium of each of Examples 1, 19, and 21 showed excellent recording and reproducing characteristics as compared to those of the medium of each of Comparative examples.

Example 22

A perpendicular magnetic recording medium of Example 22 was manufactured by adopting the manufacturing method of Example 1 except that (Fe-50% Pt)-10 mol % $SiO_2$ was used for the perpendicular magnetic recording layer.

Here, layering structure (ascending order) of Example 22 is described.

Example 22

Non-magnetic glass substrate 1/CrTi adhesion layer 2/CoFeTaZr soft magnetic layer 3/Ni alloy orientation control layer 4/Ag alloy buffer layer 5/AgGe non-magnetic seed layer 6/Ru non-magnetic intermediate layer 7/FePt—$SiO_2$ perpendicular magnetic recording layer 8/C protective layer 9.

As done to Example 1, the medium of Example 22 was subjected to TEM measurement, XRD measurement, and recording and reproducing characteristics measurement.

TABLE 8

| | Perpendicular magnetic recording layer Material | Δθ50 (deg) | Average grain size (nm) | Grain dispersion (%) | SNR (dB) |
|---|---|---|---|---|---|
| Example 1 | Co—18at%Pt—14at%Cr—10mol%$SiO_2$ | 3.1 | 6.8 | 13.4 | 22.1 |
| Example 22 | Fe—50%Pt—10mol%$SiO_2$ | 3.3 | 7 | 13.5 | 21.9 |

As can be understood from Table 8, the medium of Example 22 exerted excellent grain size dispersion and recording and reproducing characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a non-magnetic substrate;
   an orientation control layer formed on the non-magnetic substrate, the orientation control layer consisting of a nickel alloy having fcc structure;
   a non-magnetic buffer layer formed in contact with the orientation control layer of nickel alloy, the non-magnetic buffer layer containing silver and nickel, and having fcc structure;
   a non-magnetic seed layer formed in contact with the non-magnetic buffer layer, the non-magnetic seed layer consisting of silver particles having fcc structure and amorphous germanium grain boundaries between the silver particles;
   a non-magnetic intermediate layer formed on the non-magnetic seed layer, the non-magnetic intermediate layer consisting of ruthenium or ruthenium alloy; and
   a perpendicular magnetic recording layer formed on the non-magnetic intermediate layer.

2. The perpendicular magnetic recording medium of claim 1, wherein the non-magnetic buffer layer contains an additive metal selected from the group consisting of germanium, hafnium, and titanium.

3. The perpendicular magnetic recording medium of claim 2, wherein the non-magnetic buffer layer includes crystal grains having fcc structure whose main ingredient is silver and a grain boundary layer consisting of nickel and an additive metal selected from germanium, hafnium, and titanium which are surrounding the crystal grains.

4. The perpendicular magnetic recording medium of claim 2, wherein the additive metal atomic weight content is set in a range between 1 Oat % and 70 at % inclusive with respect to the total atomic weight content of silver and the additive metals.

5. The perpendicular magnetic recording medium of claim 1, wherein the non-magnetic seed layer is formed by sputtering method performed at pressure between 0.05 and 0.3 Pa inclusive under inert gas atmosphere.

6. The perpendicular magnetic recording medium of claim 1, wherein the non-magnetic seed layer contains germanium whose content is set in a range between 55 at % and 70 at % inclusive.

7. The perpendicular magnetic recording medium of claim 1, wherein the orientation control layer consists of nickel and at least one element selected from the group consisting of tungsten, chromium, carbon, molybdenum, and vanadium.

8. A magnetic recording and reproducing apparatus comprising:
   a perpendicular magnetic recording medium including a non-magnetic substrate, an orientation control layer formed on the non-magnetic substrate, the orientation control layer consisting of a nickel alloy having fcc structure, a non-magnetic buffer layer formed in contact with the orientation control layer of nickel alloy, the non-magnetic buffer layer containing silver and nickel, and having fcc structure, a non-magnetic seed layer formed in contact with the non-magnetic buffer layer, the non-magnetic seed layer consisting of silver particles having fcc structure and amorphous germanium grain boundaries between the silver particles, a non-magnetic intermediate layer formed on the non-magnetic seed layer, the non-magnetic intermediate layer consisting of ruthenium or ruthenium alloy, and a perpendicular magnetic recording layer formed on the non-magnetic intermediate layer; and a magnetic head including a device configured to record information in the perpendicular magnetic recording medium and a device configured to reproduce the information recorded in the medium.

9. The magnetic recording and reproducing apparatus of claim 8, wherein the non-magnetic buffer layer contains an additive metal selected from the group consisting of germanium, hafnium, and titanium.

10. The magnetic recording and reproducing apparatus of claim 9, wherein the non-magnetic buffer layer includes crystal grains having fcc structure whose main ingredient is silver and a grain boundary layer consisting of nickel and an additive metal selected from germanium, hafnium, and titanium which are surrounding the crystal grains.

11. The magnetic recording and reproducing apparatus of claim 9, wherein the additive metals atomic weight content is set in a range between 10 at % and 70 at % inclusive with respect to the total atomic weight content of silver and the additive metals.

12. The magnetic recording and reproducing apparatus of claim 8, wherein the non-magnetic seed layer is formed by sputtering method performed at pressure between 0.05 and 0.3 Pa inclusive under inert gas atmosphere.

13. The magnetic recording and reproducing apparatus of claim 8, wherein the non-magnetic seed layer contains germanium whose content is set in a range between 55 at % and 70 at % inclusive.

14. The magnetic recording and reproducing apparatus of claim 8, wherein the orientation control layer consisting of nickel and at least one element selected from the group consisting of tungsten, chromium, carbon, molybdenum, and vanadium.

* * * * *